United States Patent
Krakauer

[15] 3,671,031
[45] June 20, 1972

[54] FURNITURE SPRING CLIP AND ASSEMBLY

[72] Inventor: C. Leonard Krakauer, Roslyn Heights, N.Y.

[73] Assignee: Kay Manufacturing Corp., Brooklyn, N.Y.

[22] Filed: Nov. 12, 1970

[21] Appl. No.: 88,831

[52] U.S. Cl. ................................267/110, 5/259, 24/73 SS
[51] Int. Cl. .........................................A44b 21/00, F16f 3/00
[58] Field of Search ..............24/73 SS, 265 CC, 265 H, 73 B; 5/259 R, 259 B, 260, 73, 223, 225, 71; 267/111, 112, 110, 144

[56] References Cited

UNITED STATES PATENTS

| | | | |
|---|---|---|---|
| 2,685,330 | 8/1954 | Handren | 5/259 X |
| 2,652,885 | 9/1953 | Engel | 24/73 SS |
| 2,702,588 | 2/1955 | Zummach | 24/73 SS |
| 3,067,475 | 12/1962 | Molla | 24/265.3 |
| 3,098,646 | 7/1963 | Knabusch | 267/112 |

FOREIGN PATENTS OR APPLICATIONS

| | | | |
|---|---|---|---|
| 932,567 | 7/1963 | Great Britain | 5/259 |
| 168,692 | 9/1959 | Sweden | 267/111 |
| 1,174,027 | 3/1959 | France | 267/112 |
| 1,322,287 | 2/1963 | France | 5/259 |

*Primary Examiner*—Bernard A. Gelak
*Attorney*—Harry Jacobson

[57] ABSTRACT

A clip of sheet material adapted for pre-assembly, or pre-assembled, to a tension spring for the seats of backs of upholstered furniture, is attached or attachable to a slotted furniture frame element merely by passing the free end part of the clip through the slot of the frame element and tensioning the spring. The clip is L-shaped at one end and has a loop at its other end adapted to embrace or embracing the wire of the spring.

5 Claims, 8 Drawing Figures

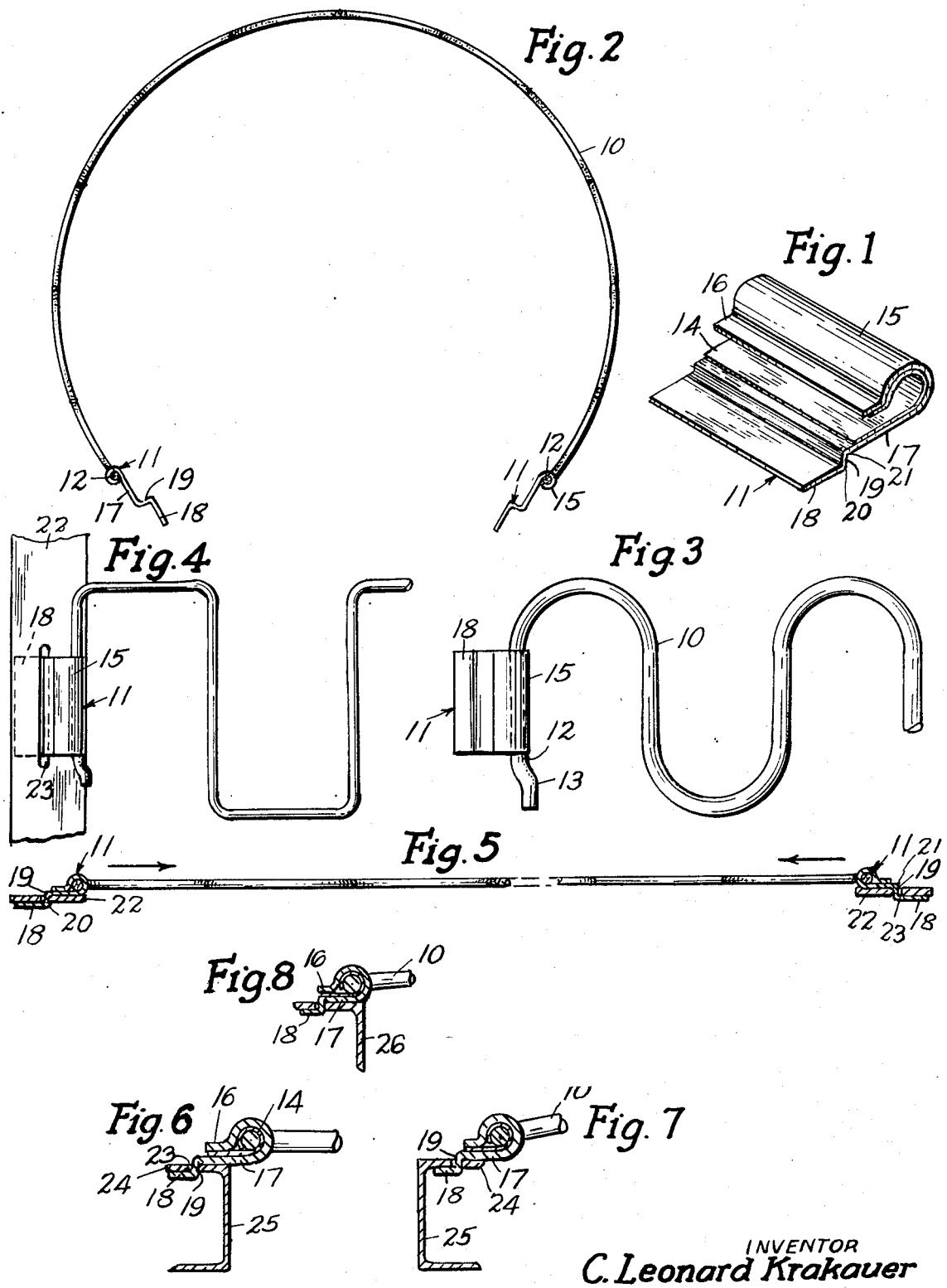

FURNITURE SPRING CLIP AND ASSEMBLY

This invention relates to the means for securing tension springs in upholstered furniture and particularly to the clips adapted for preassembly with the springs and to the installation of the pre-clipped springs to a metallic frame element.

The use of spring strips and tension springing across metallic furniture frames is well known, but has heretofore required a number of operations. The usual procedure has been to first install clips or the like fastening means to the frame and then to hook in and tension the springs and finally to close the clips on the installed springs.

The present invention is directed to the provision of means making it possible to reduce the number of operations needed for the installation of furniture springs, said means taking the form of a pre-assembly of suitably shaped clips and tensionable spring strips whereby a portion of each clip may be passed through a suitable slot in a metallic frame element or web without the need of additional fastening devices of any kind and without the necessity of closing any clips thereby to install the springs quickly and easily in their proper tensioned and operative positions in the frame.

The invention is further directed to the spring installation wherein the end of a suitably shaped clip at an end of a tension spring is merely inserted into and thereby coacts with a slotted frame element to hold the spring end in place without other aid and against accidental retraction in any direction when the spring is tensioned in the usual manner.

The invention is further directed to the provision of a spring-holding clip adapted to take a number of different forms when used with different frame elements, the clip in all forms having an L-shaped end adapted to pass through and into the slot of a slotted frame element and to be attached to the end of a spring strip prior to the passage of the clip end through said slot, the clip being further adapted for use with relatively narrow frame elements or the narrow slotted flanges or webs thereof.

The various objects of the invention will be clear from the description which follows and from the drawings, in which FIG. 1 is a perspective view of one form of the clip.

FIG. 2 is an elevational view of a pre-assembly of an arced spring strip and end clips.

FIG. 3 is a fragmentary plan view of a typical end part of a sinuous spring as it appears assembled with its clip.

FIG. 4 is a similar view of a pre-assembled clipped spring installation but showing another form of spring strip.

FIG. 5 is a foreshortened elevational view of FIG. 4 but showing both ends of the spring installation, the arrows showing the direction of the forces in the spring strip.

FIG. 6 is a vertical sectional view of a spring installation wherein the frame member is a channel and the clip inwardly overhangs the channel.

FIG. 7 is a similar view wherein the channel faces in a different direction.

FIG. 8 is a similar view wherein the frame element is an angle iron facing in a different direction.

In what follows, the tensionable resilient element of whatever form, whether sinuous, pre-arced, flat, of wire or other material, will be referred to as a spring strip or "spring," and the relatively thin slotted flange, web or plate of the frame element of the article of furniture will be termed the "web."

In the practical embodiment of the invention disclosed in FIGS. 1-3, the tensile springing takes the form of a sinuous arced wire spring 10 and the clips 11 secured thereto. Each of the clips comprises a single piece of preferably imperforate sheet material permanently attached to the end bar 12 of the spring to form a pre-assembly of a spring and clips ready for installation in a slotted web. The free end portion 13 of the end bar 12 is offset to prevent accidental separation of the spring and clip. The clip is preferably lined with suitable anti-friction material such as the coated paper liner 14 to permit the end bar to rotate noiselessly within the clip when the spring is loaded and unloaded.

Means are provided at one end of the clip for securing it to the end bar 12. As shown, said means comprises a substantially cylindrical open loop 15 adapted to embrace the bar 12 and to be closed tightly thereon. The loop may terminate in a relatively short flat edge portion 16 for easy closing at one end and is extended at the other end into a flat intermediate part 17 of the clip. Said part 17 in turn terminates in an L-shaped end portion on the clip. The outer or terminal leg 18 of said L-shaped portion has a free end edge and is preferably substantially parallel and in lateral spaced relation to the intermediate part 17. The leg 18 extends longitudinally away from the other leg 19 of said L-shaped portion, in a direction opposite to that in which the loop 15 and the part 17 extend from said other leg 19. Joining the legs is the substantially right angled bend 20, a similar bend 21 joining the leg 19 to the part 17.

Said leg 19 is suitably dimensioned to arrange the under face of said part at the upper face of the plate-like frame element or web 22 and to arrange the upper face of the leg 18 at the under face of said web (FIGS. 4-8). The height or length of said leg 19 should therefore be not less and slightly greater than the thickness of the web 22, while the length of the leg 18 may be considerably varied depending on the available contact area in the width of the web and the location of the clip-receiving slot transversely in the web.

It will be understood that the web may be a relatively thin metal plate as 22, FIGS. 4 and 5, or the flange 24 of a channel 25, FIGS. 6 and 7, or that an angle iron, FIG. 8, or the thin plate-like portion of any suitable frame element, and that the web may take various positions in the article of furniture, as when used for a seat or for a back or other part. For brevity, that surface of the web on which the looped part of the clip is intended to rest will be termed the "upper" face and that face engaged by the clip leg 18 will be termed the "lower" face regardless of the actual positions of said faces in the furniture. In any case, the length of the slot 23 in the web is not less than the width of the clip and the width of said slot is somewhat greater than the thickness of the clip material to permit rapid and easy insertion and passage of the leg 18 into and through the slot while the clip is being attached to the frame element.

To assemble the parts, the end bar 12 of the spring is inserted into the loop 15 and the clip part 16 is pressed down to close the clip. Assuming that a spring has so been pre-assembled with a clip attached to each of the ends of the spring, said spring is tilted up so that the leg 18 of a clip can pass readily through the selected slot of a web. The spring is then tilted back and stretched and the operation repeated at the other end of the spring, the spring being released when the legs of both clips have been inserted into the slots therefor. Should the spring have a clip attached to only one end thereof, the unclipped end is secured to the frame element in the usual manner, that is, by first securing a suitable clip to the element and then hooking the end bar of the spring into the clip and finally closing the clip.

The tension in the spring and the resulting forces in the direction of the arrows of FIG. 5 pull the legs 19 toward, and hold then against, the inner edges of the respective slots 23 in the frame elements and retain them there under all normal conditions. The load on the spring is transferred to the frame elements through the loops 15 which rest preferably, though not necessarily, close to the respective inner edges of said elements. In the installed positions of the parts, upward movement of the clip and the end bar held thereby is prevented by the engagement of the terminal leg 18 with the under face of the frame element, while downward movement thereof is prevented by the engagement of the intermediate part 17 of the clip or the clip loop or both with the upper face of the frame element.

Should the intermediate part of the clip be too narrow or absent, or should the selected web be so wide that the loop is spaced a substantial distance outwardly of the inner edge of the web, it might be possible for the spring to strike the inner edge of said element or web and create a click or other unwanted noise when the spring is loaded. For best results therefore, the parts of the clip including the intermediate part 17 or corresponding parts, are suitably dimensioned to coact properly with the particular element carrying the clip, of whatever width said element might be. The clip and spring assembly can be used on webs which are quite narrow, as well as relatively wide ones, even though an intermediate part as 17 is present in the clip. As shown in FIGS. 6 and 7, the part 17 may be so wide as to arrange the loop 15 inwardly beyond and to overhang the web, in which case the sheet material used for the clip is made thick enough to transfer the load on the spring to the frame element without distortion or damage to the parts, and the slot in the web need not be made unduly close to the inner edge of the web.

In FIG. 8, the intermediate part of the clip is quite short and the clip rests with its loop at or close to the inner edge of the angle iron frame element 26.

It will be seen that in all of the forms of the clip, once it has been pre-assembled to its spring, it is installed in the frame element by a mere tilting and advancing movement without the need for any additional fasteners or closing operations and that the various objects of the invention have been adequately attained.

While certain specific forms of the invention have herein been shown and described, various obvious changes may be made therein without departing from the spirit of the invention defined by the appended claims.

I claim:

1. A clip and spring assembly quickly securable to a slotted flat web of a furniture frame, said assembly comprising an elongated zig-zag spring having a transversely extending end bar at each end thereof, and a clip permanently secured to each end bar, each clip being imperforate and of sheet material of uniform width throughout and having means at one end thereof for securing the clip to the spring, said means being in the form of a substantially cylindrical loop embracing and substantially closed upon the major part of the circumference of said end bar and permitting oscillation of said bar within the loop when the spring is loaded and unloaded, said clip having a flat intermediate horizontal base extending outwardly from the lowermost part of said loop and adapted to have the under surface thereof rest on the upper flat surface of said slotted frame web, said clip terminating in an L-shaped portion extending downwardly from said base and having a flat terminal leg substantially parallel to and in downward spaced relation to said base and adapted to become arranged below the under face of said slotted frame web, the other leg of said L-shaped portion joining said terminal leg to said base and being dimensioned to arrange the loop and the base on the upper face of said slotted frame web.

2. The clip and spring assembly of claim 1, the loop terminating in a flat edge portion extending outwardly therefrom and adapted to receive loop-closing pressure when the loop is to be closed around the end bar of the spring, said flat edge portion terminating adjacent said other leg of the L-shaped portion.

3. In a furniture spring installation, the clip and spring assembly of claim 2 and a pair of furniture frame elements each having a flat relatively thin sheet metal web provided with a relatively narrow elongated slot therethrough of approximately the width of said clips in length and of approximately the thickness of the material of said clips in width, the terminal leg of each clip being underneath the under face of the web of said frame element and in outward spaced relation to the end bar of the spring.

4. The furniture spring installation of claim 3, the loop and the base of each clip resting on and holding the end bar above the upper surface of the frame web and transmitting thereto loads put upon the spring, the loop terminating in a flat edge portion extending outwardly and angularly therefrom and adapted to receive loop-closing pressure when the loop is to be closed around said end bar, said flat end portion terminating adjacent the slot and being substantially parallel to the base of the clip.

5. The furniture spring installation of claim 3, the inner part of the base of the clip projecting inwardly beyond the inner edge of the frame web and the outer portion only of said base resting on the upper surface of said web.

* * * * *